United States Patent [19]
Horikiri

[11] Patent Number: 5,006,882
[45] Date of Patent: Apr. 9, 1991

[54] IMAGE RECORDING APPARATUS

[75] Inventor: Keiichi Horikiri, Tokyo, Japan

[73] Assignee: Seiko Instruments Inc., Japan

[21] Appl. No.: 389,009

[22] Filed: Aug. 3, 1989

[30] Foreign Application Priority Data

Aug. 26, 1988 [JP] Japan .......................... 63-112648[U]
Apr. 27, 1989 [JP] Japan .................................. 1-108417

[51] Int. Cl.$^5$ .............................................. G03B 27/32
[52] U.S. Cl. .......................................... 355/27; 355/73
[58] Field of Search ................... 355/72, 73, 76, 27, 355/28; 430/138; 271/91, 92, 93, 95, 103, 104, 107, 145, 121

[56] References Cited

U.S. PATENT DOCUMENTS

| | | | |
|---|---|---|---|
| 3,836,139 | 9/1974 | Shimizu | 271/95 |
| 4,399,209 | 8/1983 | Sanders et al. | 430/138 |
| 4,440,846 | 4/1984 | Sanders et al. | 430/138 |
| 4,506,876 | 3/1985 | Nishibori | 271/167 |
| 4,783,683 | 11/1988 | Nagumo et al. | 355/27 |

*Primary Examiner*—L. T. Hix
*Assistant Examiner*—Khanh Dang
*Attorney, Agent, or Firm*—Bruce L. Adams; Van C. Wilks

[57] ABSTRACT

An image recording apparatus has a sheet feeding device which employs the structure wherein pawls or the like disposed at part of the sheet feeding device push down both ends of the sheet to be fed so as to separate the sheets that overlap with one another. The sheet feeding device further employs the structure which pushes the sheet, that falls onto a sheet tray, into the tray in order to store the sheet in the sheet tray.

27 Claims, 10 Drawing Sheets

IMAGE RECORDING APPARATUS

BACKGROUND OF THE INVENTION

This invention relates to an image recording apparatus, and more particularly to a sheet feeding device for image recording sheets to be used for the image recording apparatus.

U.S. Pat. Nos. 4,399,209 and 4,440,846 and U.K. Pat. No. GB 2,223,860 to Mead Corporation describe an imaging system. According to this system, a photosensitive layer or medium comprising microcapsules containing a photosensitive composition in the internal phase is image-wise exposed to actinic radiation and subjected to a uniform rupturing force, whereby the microcapsules rupture and image-wise release the internal phase. An image-forming agent such as a substantially colorless chromogenic material is typically associated with the microcapsules such that when the microcapsules rupture the chromogenic material is able to image-wise react with, a developer material and produce a color image. The photosensitive layer and developer may be both formed on a single sheet (image recording sheet) a disclosed in U.S. Pat. No. 4,440,846, or may be formed on separate sheets (imaging sheet and image receiving sheet) as disclosed in U.S. Pat. No. 4,339,209. As the image recording sheet and the image receiving sheet both receive images from the photosensitive layer, and for ease of description, the generic term "image receiving sheet" is used hereinafter to refer to both types of sheets. Since this printing system can produce pixels on the same size as the size of a microcapsule, that is in the order of μm, a color image is printed with extremely high resolution.

However, there have been such problems that, since the developer is coated on the surface of the image-receiving sheet, the image-receiving sheet becomes scratched by a sheet feeding roller when it is taken out from a sheet tray causing peeling off of the developer material, which not only deteriorates the picture image quality, but also causes simultaneous feeding of multiple image-receiving sheets (hereafter referred to as duplicate supply) because the sheets are difficult to slide due to the large friction between sheets.

SUMMARY OF THE INVENTION

An object and advantage of the present invention is to provide an image recording apparatus with a sheet feeding device which is able to take out a sheet without damaging the developer on the sheet surface.

Another object of the present invention is to provide an image recording apparatus with a sheet feeding device which is able to surely take out sheets one by one from the sheet tray without causing duplicate supply.

A further object of the invention is to provide an image recording apparatus with a sheet feeding device which is able to push a sheet, that falls onto the sheet tray, into the sheet tray in order to store the sheet in the sheet tray.

The above and other related objects and features of the invention will be apparent from a reading of the following description thereof in conjunction with the accompanying drawings and the novelty thereof pointed out in the appended claims.

DESCRIPTION OF THE PREFERRED EMBODIMENT

Figure 1:
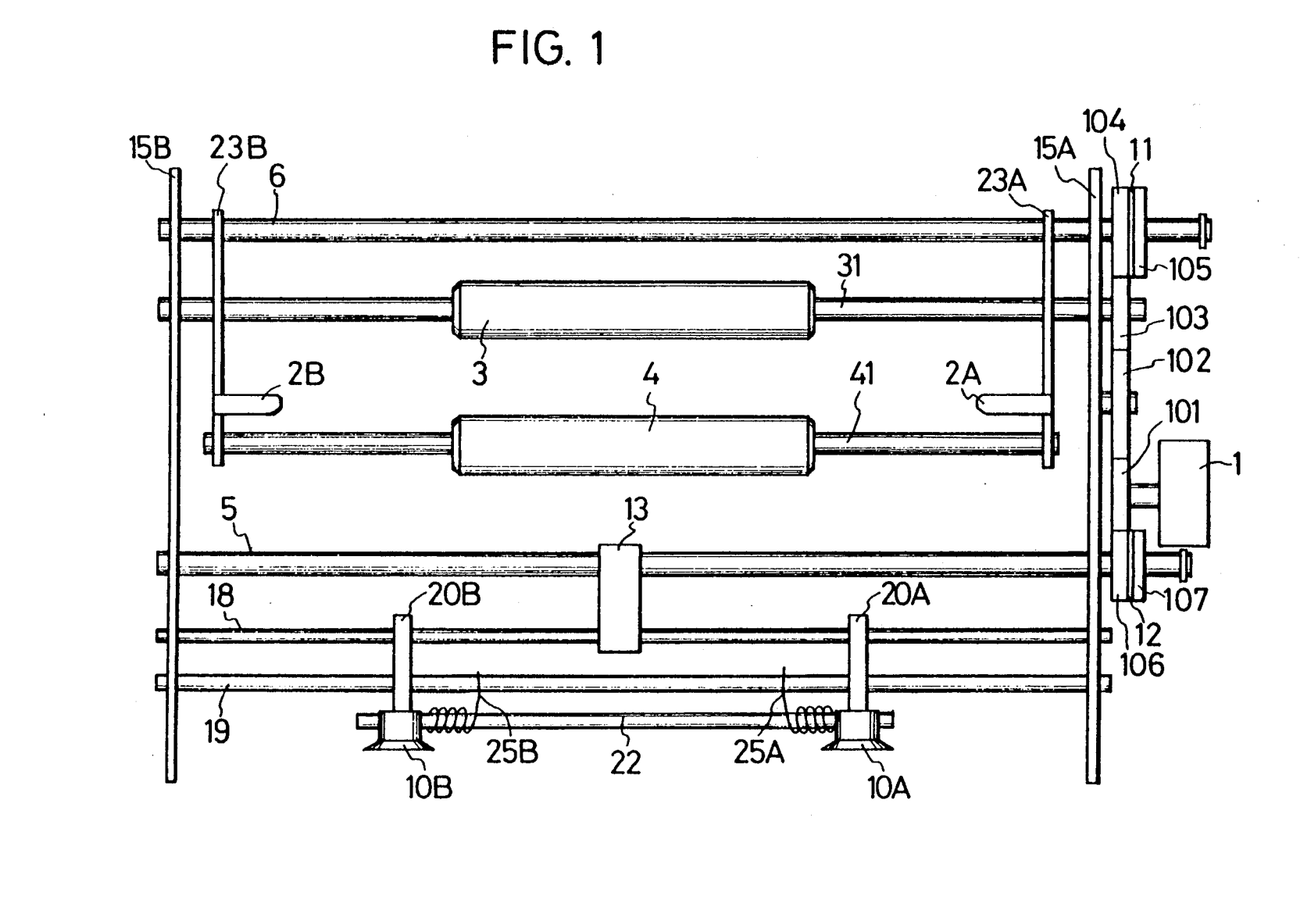
FIG. 1 is a front view of a sheet feeding device showing an embodiment according to the present invention.
Figure 2:
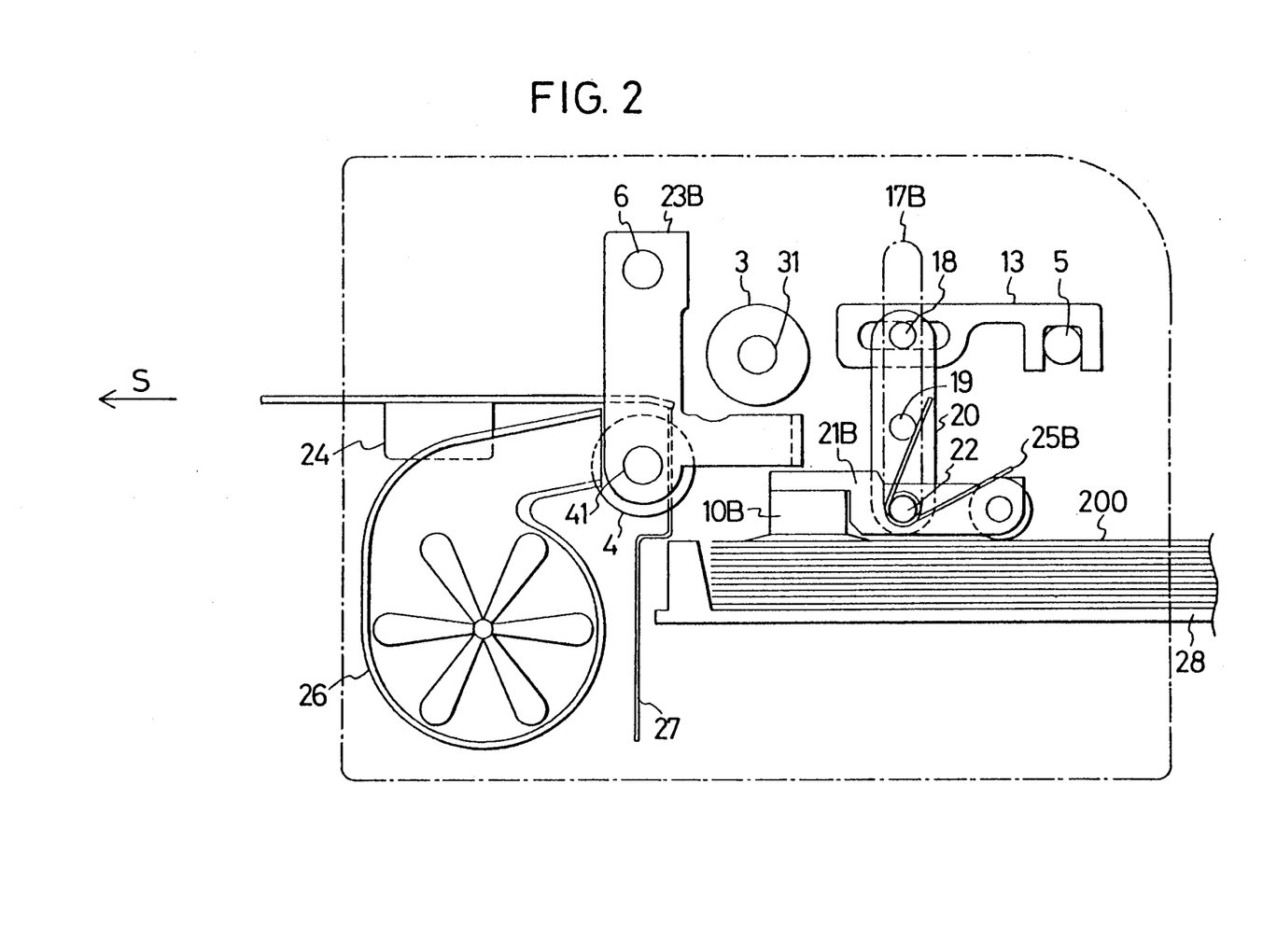
FIG. 2 is a side view of the sheet feeding device shown in FIG. 1.
Figure 3:
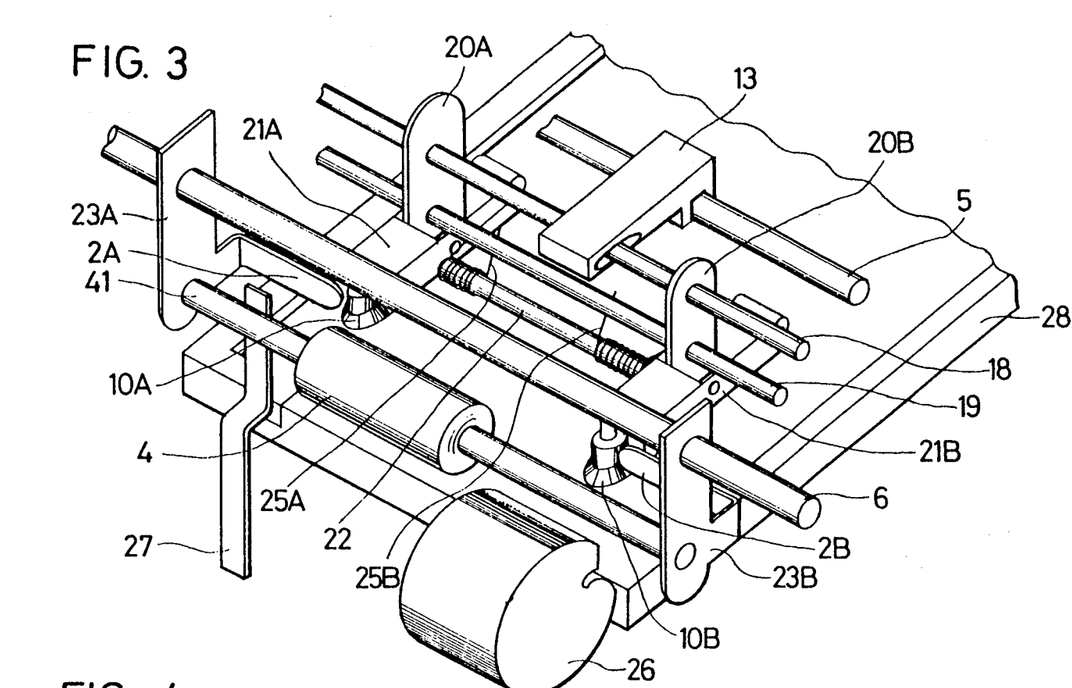
FIG. 3 is a perspective view showing a principal part of the sheet feeding apparatus shown in FIG. 1.

FIG. 1 is a front view of a sheet feeding device showing an embodiment of the present invention and FIG. 2 is its side view which is a structural arrangement view with a side plate 15B represented by one-dot-chain line. FIG. 3 is a perspective view of the principal portions of the sheet feeding apparatus shown in FIG. 1. In the drawings, a motor 1 receives a signal from a controller 40 which is described later. The power generated by the motor 1 is transmitted through a pulley 101 and gears 102 and 103. A paper feed roller shaft 31 fixed to the gear 103 rotates with a paper feed roller 3 disposed on the paper feed roller shaft 31. The gear 103 is mechanically connected to a gear 104, which is supported rotatably by a paper feed link shaft 6. A gear 105 is fixed to the paper feed link shaft 6. A slip seat 11 is interposed between the gears 104 and 105 so that the power transmitted from the gear 104 is transmitted to the gear 105 through the slip seat 11 and rotates the paper feed link shaft 6. In a friction conduction mechanism consisting of the gears 104, 105 and slip seat 11, the slip seat 11 absorbs any excessive load when a load of a certain extent is applied thereto so that not all the power of the gear 104 is transmitted to the gear 105. Accordingly, it is possible to prevent excessive pressure-contact force of a pressure-contact roller 4 from acting on the image receiving sheet 200.

Arms 23A and 23B are fixed to the paper feed link shaft 6 and a pressure-contact roller shaft 41 equipped with a pressure-contact roller 4 is interposed between these arms 23A, 23B. Separation members 2A, 2B for separating duplicate supplied image receiving sheets are provided on the arms 23A, 23B along the axial direction of the pressure-contact roller 4.

A sensor 24 for sensing the imaging sheet 200 is disposed on the feed side of the imaging sheet 200 by the paper feed roller 3 and the pressure-contact roller 4.

The motor pulley 101 is mechanically connected to a gear 106. This gear 106 is rotatably supported by a sucking disc link shaft 5 and a gear 107 is fixed also to this shaft 5. Another slip seat 12 is interposed between these gears 106 and 107 so that the power transmitted from the gear 106 is transmitted to the gear 107 through the slip seat 12 and rotates the sucking disc link shaft 5. Since a friction conduction mechanism consisting of the gears 106, 107 and the slip seat 12 is the same as the friction conduction mechanism consisting of the gears 104, 105 and slip seat 11, its explanation will be omitted. A link 13 is fixed to the sucking disc link shaft 5 and the rotary motion of the link shaft 5 is transmitted to this link 13. When the link 13 is turned in opposite directions by bidirectional rotation of the sucking disk link shaft 5, shafts 18 and 19 reciprocate up and down in elongated hole portions 17A, 17B shown as one-dot-chain line in FIG. 2 bored on the side plates 15A, 15B. Substrates or levers 20A, 20B are fixed to the shafts 18, 19 in such a manner as to interpose the link 13 from both sides, respectively. Sucking disc supporting blocks 21A, 21B each equipped with a sucking disc 10A, 10B are fixed to these levers or substrates 20A, 20B by a rotary shaft 22. One of the ends of each torsion coil spring 25A, 25B supports the rear end of each sucking disc supporting block 21A, 21B with the other end supporting the shaft 19 with the rotary shaft 22 being the center.

In FIG. 2, a fan 26 is disposed at a position to blow air to the image receiving sheets that are turned up by the sucking discs 10A and 10B. There is disposed a paper return member 27 so that one of its ends hooks on the pressure-contact roller 41 while the other end is fixed to a stationary member not shown in the drawing.

Figure 4:
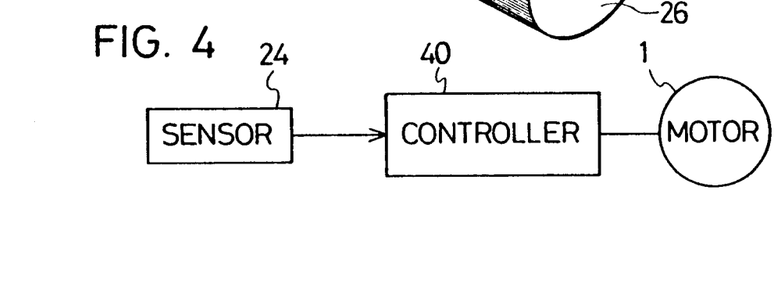
FIG. 4 is a block diagram showing an embodiment of a control unit of the sheet feeding device.

FIG. 4 shows a block diagram showing a control unit of the sheet feeding device. A controller 40 comprising a micro-computer controls the forward and reverse rotations of the motor 1 in a predetermined interval upon receiving the signal from a paper sensor 24 as described hereinafter.

Next, the operation of the paper feeding device having such a construction will be described with reference to the flowchart shown in FIG. 5, FIGS. 6A to 6F and FIGS. 7A and 7B which show the front state of part of the operation processes under the operation state shown in FIGS. 6A to 6F.

Figure 5:
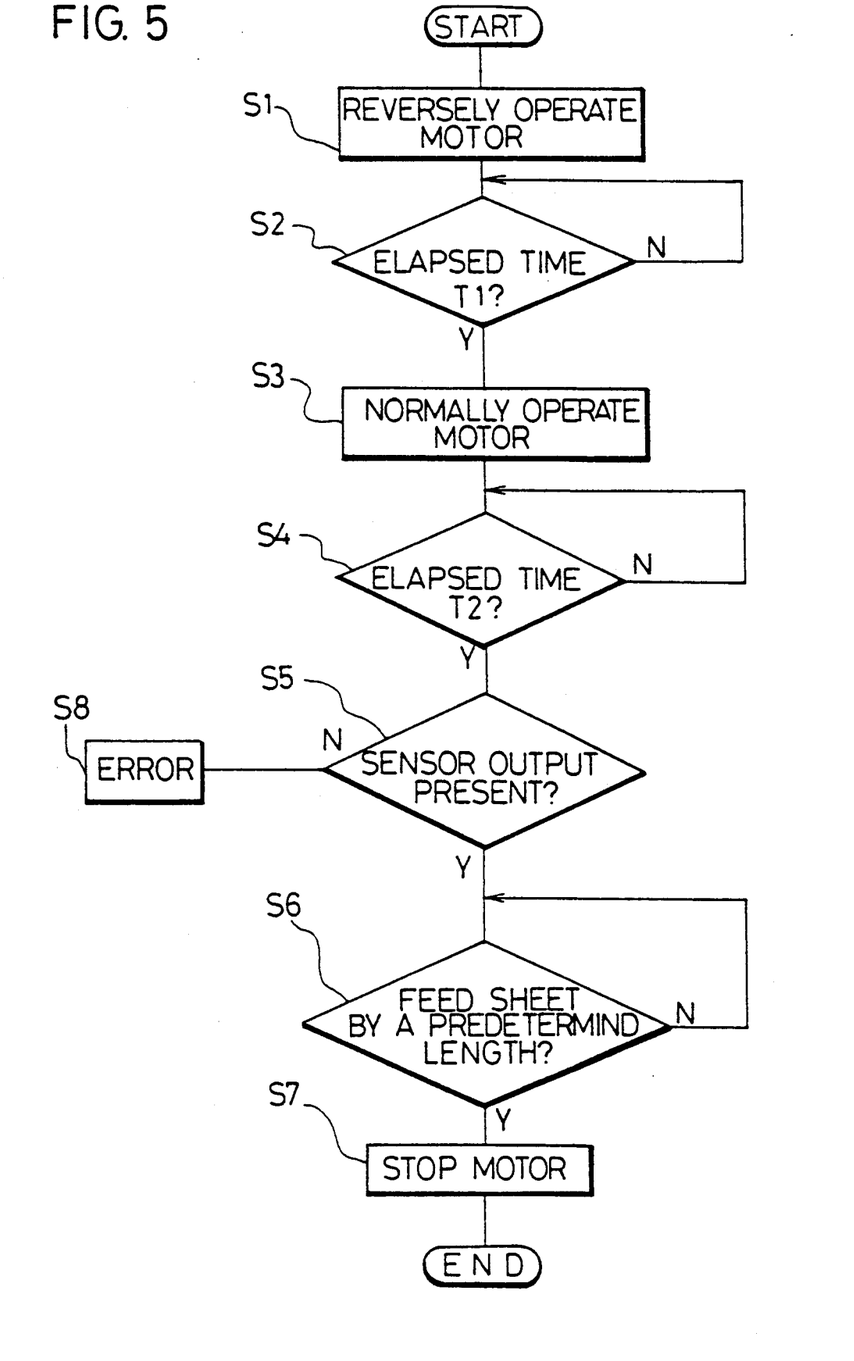
FIG. 5 is a flow chart showing the operation of the sheet feeding device.
Figure 6A:
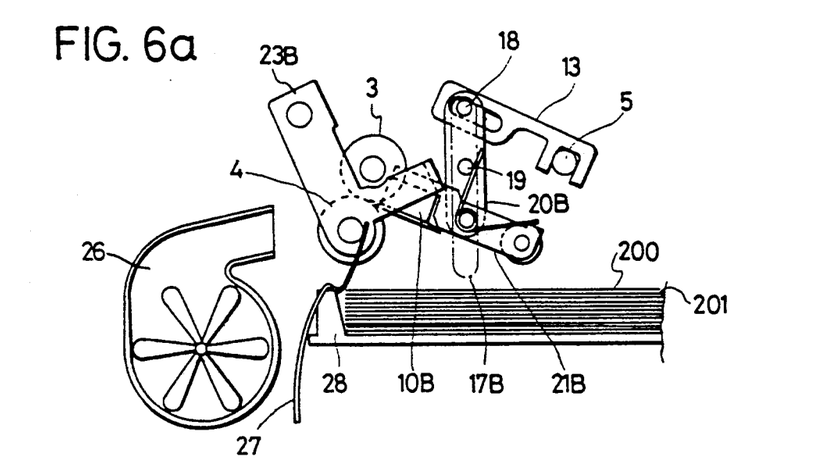
FIGS. 6A to 6F are explanatory views showing the operation of the sheet feeding device.
Figure 6B:
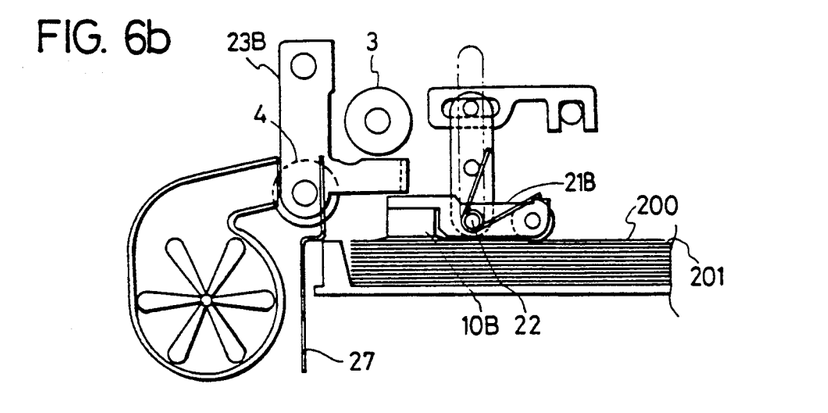

FIG. 6A shows the state after an image receiving sheet has been transferred into the image recording apparatus by the paper feed roller 3 and the pressure-contact roller 4. When the apparatus is operated from this state, the motor 1 rotates reversely (step S1 in FIG. 5) and the link shaft 5 and the link 13 rotate counterclockwise through the friction conduction mechanism comprising the gears 106, 107 and the slip sheet 12. Since the shaft 18 is disposed in an elongated hole of the link 13 and in the elongated hole 17A, 17B of the side plates 15A, 15B, the shaft 18 moves down in the elongated hole portions 17A, 17B of the side plates 15A, 15B. As described already, the sucking discs 10A, 10B, the rotary shaft 22 and the torsion coil springs 25A, 25B are coupled to the shaft 18. Accordingly, they also move down simultaneously. When they move down and one of the ends of each sucking disc supporting block 21A, 21B comes into contact with the surface of the image receiving sheet 200 as shown in FIG. 6B, the sucking disc supporting block 21 rotates counterclockwise with the rotary shaft 22 so that the sucking discs 10A, 10B are brought into pressure contact with the surface of the image receiving sheet 200 and adsorbs it. The motor 1 keeps rotating reversely for a predetermined period T1 while the sucking discs 10A, 10B are kept in pressure-contact with the image receiving sheet 200, but since its driving force is relieved by the friction conduction mechanism comprising the gears 106, 107 and the slip sheet 12, no excessive pressure-contact force act on the image receiving sheet 200. Subsequently, the pressure-contact roller 4 leaves the paper feed roller 3.

Figure 6C:
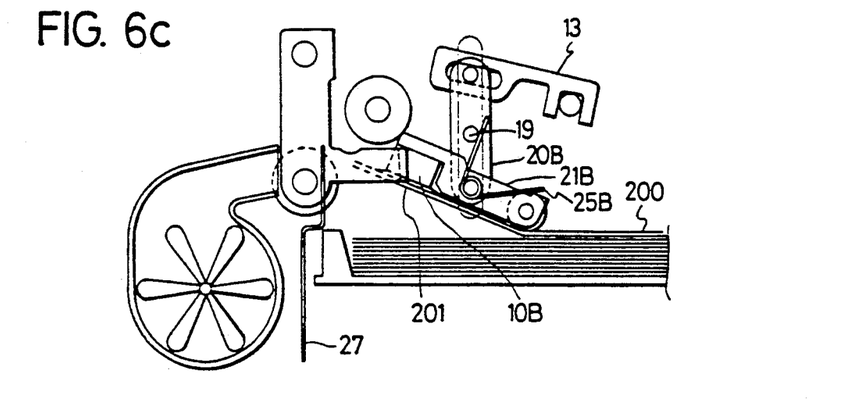
Figure 7A:
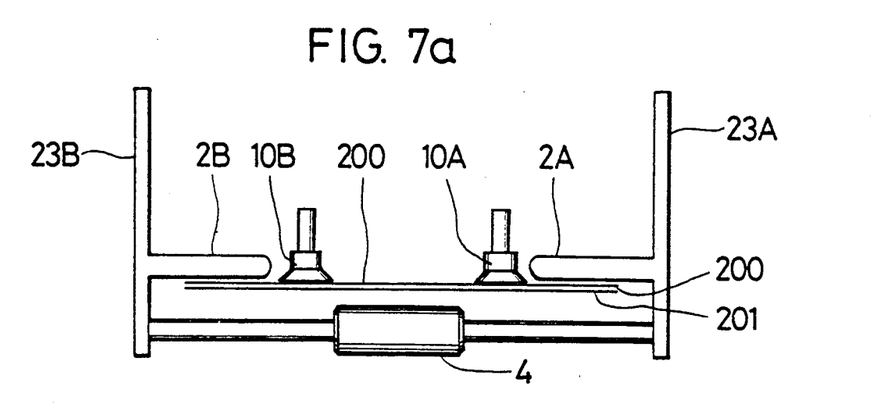
FIG. 7A and FIG. 7B are explanatory views showing the operation of taking out sheets without causing duplicate supply.

After the passage of the predetermined period T1 (step S2 in FIG. 5), the motor 1 rotates normally or forwardly as shown in FIGS. 6C and 7A (step S3 in FIG. 5), and the substrate 20 moves upwardly by the link 13 rotating clockwise. Accordingly, the tip of the sucking disc supporting block 21 equipped with the sucking disc 10A, 10B is lifted up by the torsion coil spring 25B and the image receiving sheet 200 is turned up by the force of adsorption of the sucking disc 10 with one of the ends of each sucking disc supporting block 21A, 21B being the support point. This turn-up operation is complete when the sucking disc blocks 21A, 21B come into contact with the levers or substrates 20A, 20B.

It will be assumed in this instance that another image receiving sheet 201 overlapping with the image receiving sheet 200 supported by the sucking discs 10A, 10B comes into close contact with the image receiving sheet 200 due to the moisture of the developer coated on the surface or the like and is lifted up together with the image receiving sheet 200. In other words, the image receiving sheet 201 is not supported by the sucking discs 10A, 10B.

Figure 6D:
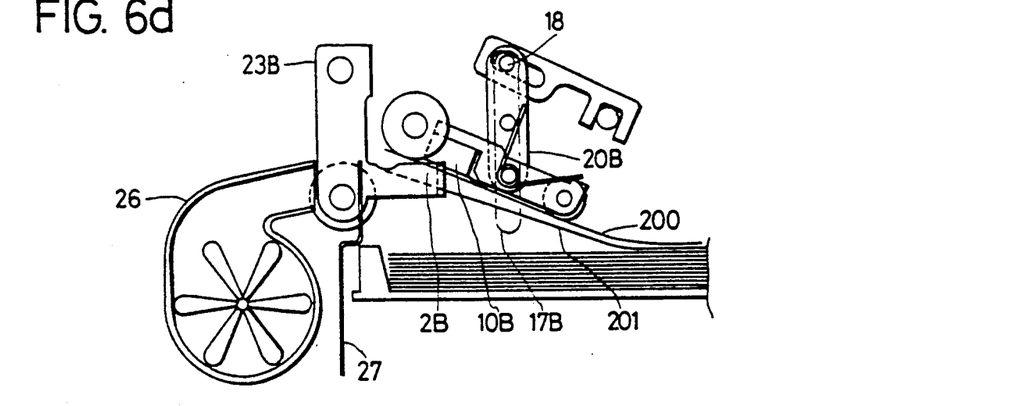
Figure 6E:
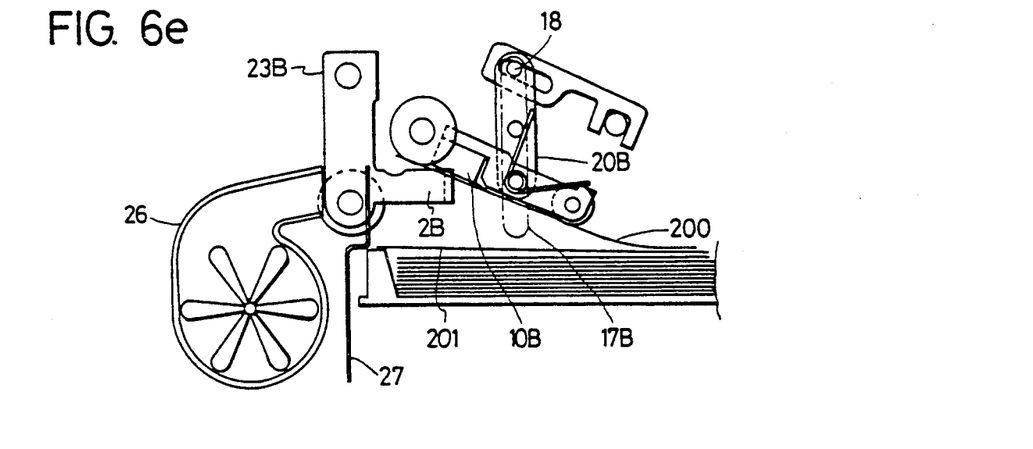
Figure 7B:
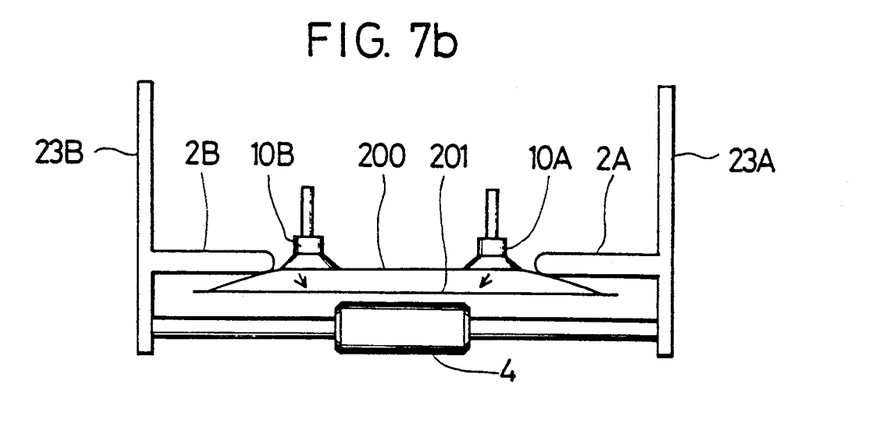

As shown in FIGS. 6D and 7B, when the levers or substrates 20A and 20B further rise and the shaft 18 reaches the upper end of the elongated holes 17A and 17B, the driving force escapes through the friction conduction mechanism comprising the gears 106, 107 and the slip sheet 12 and at this time, both ends of the image receiving sheet 200 are pushed down by the separation members 2A, 2B formed on the arms 23A, 23B so that both the image receiving sheets 200, 201 are curved and the image receiving sheet 201 attaching to the back of the image receiving sheet 200 is separated from it due to the "stiffness" of the sheets. In other words, when the image receiving sheets 200, 201 are flexed or curved, the restoring force that attempts to keep the image receiving sheet 201 in its original and flat state acts on the image receiving sheet 201 (which is not held with respect to the image receiving sheet 200 which is held by the sucking discs 10A, 10B) and the image receiving sheet 201 is separated from the image receiving sheet 200. As the separation members 2A, 2B push down the image receiving sheets 200, 201, the image receiving sheets 200, 201 are separated sufficiently but their separation can be promoted by blowing air between the image receiving sheet 200 which is turned up and the image receiving sheet 201 attaching to the back of the former by the separation fan 26. Incidentally, the same effect can be obviously obtained by use of means capable of blowing air to the image receiving sheets 200, 201 without using the separation fan 26. The separated image receiving sheet 201 falls then back onto the sheet tray 28 as shown in FIG. 6E and but rests on an edge portion rather than the storage portion of the sheet tray 28 as shown in the drawing.

Figure 6F:
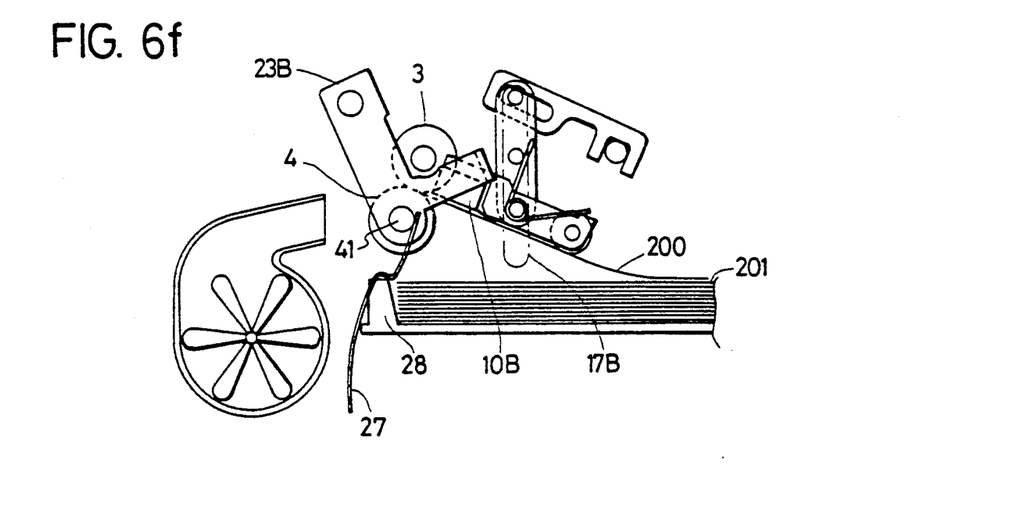

Subsequently, the image receiving sheet 200 is transferred into the image recording apparatus by the paper feed roller 3 and the pressure-contact roller 4 at the point of time when these rollers come into mutual contact as shown in FIG. 6F. At this time, the paper return member 27 deflects due to the rotary motion of the pressure-contact roller shaft 41 with the arm 23 being the center and the imaging sheet 201 which was placed on the upper edge portion of the sheet tray 28 due to the separating operation described above is returned into the storage portion of the sheet tray 28. The motor 1 keeps rotating normally or forwardly for a predetermined period T2 (step S4 in FIG. 5), and its excessive driving force escapes through the friction conduction mechanism comprising the gears 106, 107 and the slip sheet 12.

When a signal representing that the image receiving sheet 200 has been transferred to the sensor 24 is outputted (step S5 in FIG. 5), the controller 40 actuates the motor 1 till it reaches a predetermined number of revolution and feeds the image receiving sheet 200 to a predetermined position, such as to the developing position (step S6 in FIG. 5). After this, the controller 40 stops the motor 1 (step S7 in FIG. 5).

On the other hand, when the motor 1 is rotated normally but a signal is not outputted from the sensor 24 (step S5 in FIG. 5), the controller 40 sends a paper feed error signal to the image recording apparatus (step S8 in FIG. 5).

Even when the delivery of the image receiving sheets from the sheet tray 28 proceeds and the surface position of the image receiving sheet lowers, the sucking discs 10A, 10B are driven by the force determined by the friction conduction mechanism comprising the gears 106, 107 and the slip sheet 12. Accordingly, they are brought into pressure contact until a predetermined suction force is generated, irrespective of the height of the image receiving sheets stored in the sheet tray 28.

Figure 10:
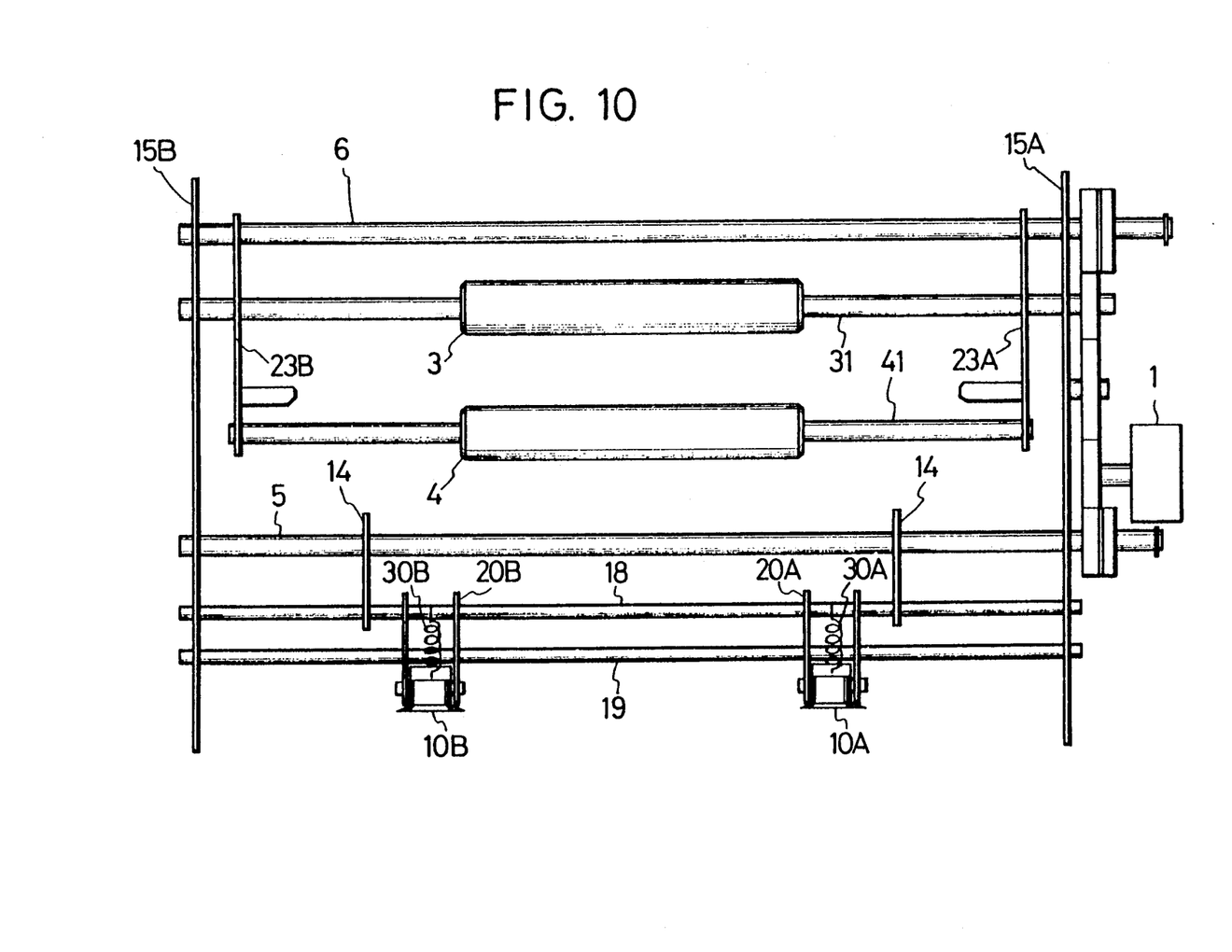
FIG. 10 is a front view of a sheet feeding device showing another embodiment according to the present invention.
Figure 11:
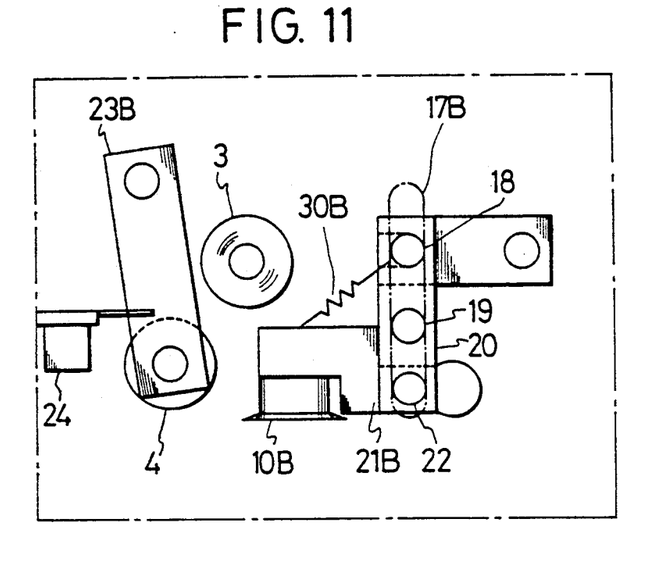
FIG. 11 is a side view of the sheet feeding device shown in FIG. 10.

FIGS. 10 and 11 show another embodiment of the present invention. In the drawings, reference numeral 1 represents the motor which receives a signal from the controller 40 and is coupled to the shaft 31 of the paper feed roller 3 and to the paper feed link shaft 6 through gears. The shaft 41 of the pressure-contact roller 4 is fixed to the pair of arms 23A, 23B that are fixed to the paper feed link shaft 6 connected to the pulse motor 1 through a friction conduction mechanism. The paper sensor 24 for sensing the image receiving sheet is disposed on the delivery side of these two rollers 3 and 4. Reference numerals 10A, 10B represent sucking disc. A pair of arms 14 fixed to the link shaft 5 connected to the motor 1 through the friction conduction mechanism are arranged in such a manner as to reciprocate shafts 18 and 19 which are idly fitted into an elongated hole portion 17 of each side plate 15A, 15B. Substrates or levers 20A, 20B are fixed to these shafts 18 and 19, respectively. The sucking disc supporting blocks 21A, 21B equipped with the sucking discs 10A, 10B described above are fixed to each substrate 20 by a rotary shaft 22. One of the ends of a tension spring 30 supports the tip of the sucking disc supporting block 21 and the other end supports the shaft 18.

The operation of the second embodiment is the same as that of the first embodiment.

Figure 12:
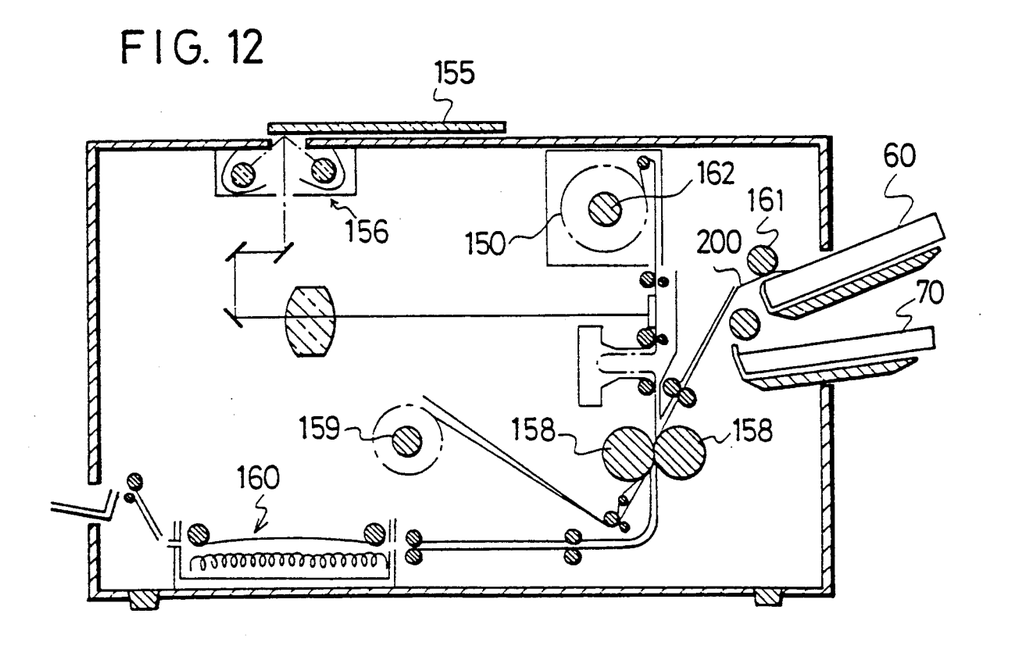
FIG. 12 is a block diagram showing an example of an image recording apparatus according to the present invention.

FIG. 12 is a block diagram showing an example of an image recording apparatus suitable for the sheet feeding device according to the present invention. High power cylindrical lamps, e.g. halogen lamps are disposed in a ease body 156 and provided with parabolic reflectors at the back thereof. The light from the lamps is reflected by an original image mounted on an original image mount 155. The reflected light is projected on the imaging sheet 150 through light reflecting and condensing member. The imaging sheet 150 is transferred from a feed roller 162 to a winding roller 159 through a light projecting station where latent image are formed on the imaging sheet 150. When the latent image is formed completely by the exposure device, a pressure sufficient to collapse microcapsules is applied by means of pressure rollers 158, 158 under such a state that the image receiving sheet 200 is fed from the sheet feed cassette 60 and placed it upon the imaging sheet 150, thereby to have coloring precursors in the quantity corresponding to exposure quantity ooze out onto the image receiving sheet 200. The image receiving sheet 200 is made to rise in temperature at a heating portion 160 so as to advance rapidly the reaction between coloring precursors and the developer, thereby to assume colors of the picture image in the image receiving sheet. According to such a recording system, it becomes possible to have a picture element appear in a size equivalent to a microcapsule. Therefore, it becomes possible to print a color picture image with a very high resolution.

Though two sucking discs 10A, 10B are disposed in the transverse direction of the sheet in the embodiments described above, the same action and effect can be obtained obviously by disposing one or at least three sucking discs, and furthermore, in the sheet moving direction, so long as a structure capable of curving the image receiving sheets is provided to the paper feeder. For example, the image receiving sheet may be pushed down between the two sucking discs. The separation member is formed in the disclosed embodiments in the vertical direction relative to the transferring direction of the image receiving sheet but may be formed in the transferring direction. The same effect can be obtained by pushing down and curving the image receiving sheets from the side opposite to the sucking discs 10A, 10B.

Figure 8A:
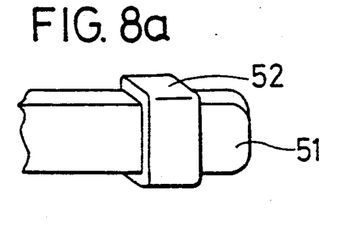
FIGS. 8A to 8D are perspective views showing a principal portions of the separation member used for the sheet feeding device of the present invention.
Figure 8B:
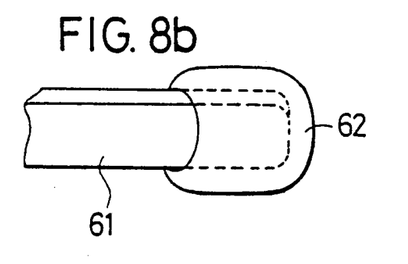
Figure 8C:
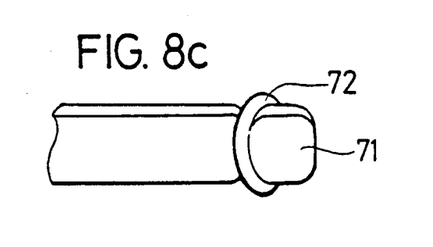
Figure 8D:
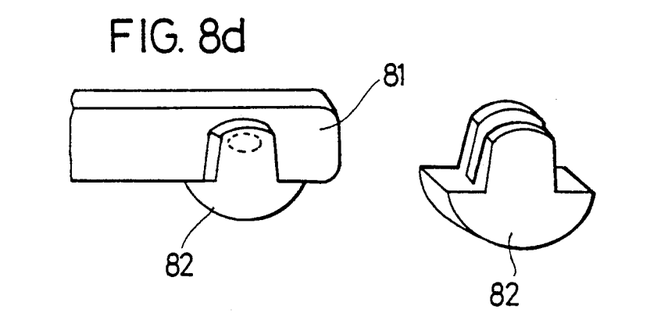

FIGS. 8A to 8D show perspective views of the principal portions of a separation member with a protective member. FIG. 8A shows a perspective view of the principal portions of a separation member 51 with a belt-like protective member 52 wound at the tip of the separation member made of a metallic material or the like. FIG. 8B shows a perspective view of the principal portion of a separation member 61 with a protective member 62 which covers the tip of the separation member. FIG. 8C is a perspective view of the principal portions of a separation member 71 with a notch formed at part of the tip and a ringlike protective member 72 disposed at this notch. FIG. 8D shows a perspective view of the principal portions of a separation member 81 with a recess or hole formed at the tip, part of a protective member 82 disposed at the hole or recess and the protective member 82 disposed only on the contact side of the tip with the image receiving sheet. The protective members 52, 62, 72, 82 may be made of fibers, paper, rubbers, synthetic resins, sponges, and the like which have a relatively low surface hardness, or ceramics, aluminum, brass, stainless steel, and the like which have a relatively high surface hardness but do not have any corrugations at the contact portion with the image receiving sheet. In other words, it is possible to use those materials and shapes which do not damage or scratch the delicate image forming agent. The tip itself may be made of a rubber or a synthetic resin. If the protective member 52, 62, 72, 82 is disposed at a part of the separation member for separating the overlapped image receiving sheets, a high quality image free from scratches or the like can be always obtained.

Though the paper return member 27 for returning the image receiving sheet into the storage portion of the sheet tray 28 operates while following up the movement of the paper feeding device in the described embodiments, it may be operated by another driving source without being affected by the paper feeding device so as to store the image receiving sheets into the sheet tray 28. The paper return member 27 need not be bent but may be straight and its shape may be arbitrary such as a round rod, a triangular pole, etc., so long as it can push the image receiving sheets into the sheet tray 28.

Figure 9:
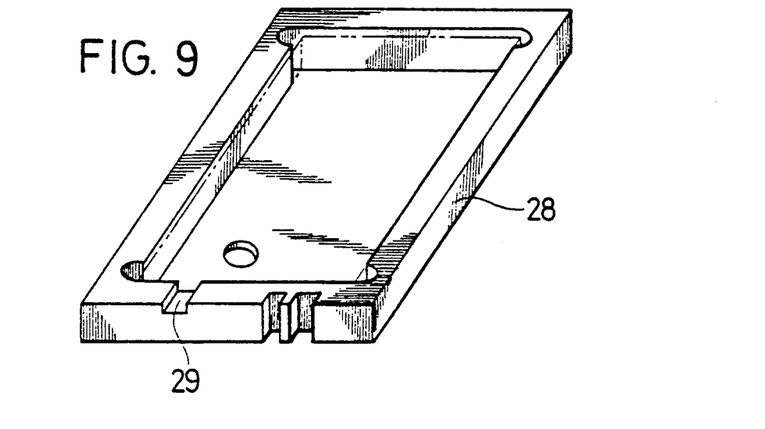
FIG. 9 is a perspective view of a sheet tray used for the sheet feeding device of the present invention.

The sheet tray 28 used in the apparatus described above may be provided with a shape such that when the image receiving sheets are returned into the sheet tray 28 by the paper return member 27, the paper return member 27 does not come into contact with the tray 28. FIG. 9 is a perspective view of such a sheet tray. A recess 29 is formed on one of the upper edges or sides of the sheet tray 28 on the loading side relative to the paper feeding device. When the rectangular paper return member 27 is pushed by the pressure-contact roller shaft 41 and returns the image receiving sheets into the sheet tray 28, this recess 29 has a shape such that the contact between the sheet tray 28 and the paper return member 27 can be avoided.

In the embodiments described above, the suction force is generated by a pressure-contact force, but the same action can be obviously obtained by causing suction and peel through a valve by connecting the sucking disc to a pump through a tube. Though the embodiments described above use the sucking disc as the article creating the suction force, the same action can be obtained obviously by use of other articles than the sucking disc the suction force.

Furthermore the same effect can be obtained in the case of ordinary paper not coated with the developing material.

As described above, the present invention can prevent the peel of the developing material and can improve image quality by minimizing the frictional force acting on the sheet surface and, can also promote one-by-one feeding of the sheets to minimize duplicate supply of the sheets and can make reliable paper feed operations.

What is claimed is:

1. An image forming apparatus for forming a latent image on a photosensitive medium having capsules containing chromogenic material and a radiation curable composition on one surface thereof and developing the latent image by rupturing the capsules and contacting the chromogenic material with a developer material, comprising:

exposure means for exposing the photosensitive medium to light representative of an image to form a latent image thereof on the photosensitive medium;

a sheet having the developer material on one surface thereof;

feeding means for feeding the sheet into the image forming apparatus, the feeding means having suction means disposed at one end of a movable member, the other end of the member contacting the surface of the sheet at a point of contact and being turnable around the point of contact, whereby the sheet is sucked by the suction means and lifted up by turning the suction means around the point of contact;

developing means for rupturing the capsules and contacting the chromogenic material with the developer material on the surface of the sheet; and conveyor means for conveying the sheet fed by the feeding means to the developing means.

2. An image forming apparatus according to claim 1; wherein the feeding means further comprises two rollers for holding the sheet therebetween, at least one roller being disposed at one end of a rotatable arm, and rotating means for rotating the arm so as to contact the one roller with the other roller.

3. An image forming apparatus according to claim 2; wherein the rotating arm includes a paper return member disposed at one end of the rotating arm for pushing a sheet placed on the upper surface of a sheet tray into the storage portion of the sheet tray.

4. An image forming apparatus according to claim 2; wherein the rotating arm further comprises means for preventing double feeding of the sheets.

5. An image forming apparatus according to claim 1; wherein the feeding means includes means for lifting up the other end of the member to reduce the contact pressure at the point of contact.

6. An image forming apparatus for forming a latent image on a photosensitive medium having capsules containing chromogenic material and a radiation curable composition on one surface thereof and developing the latent image by rupturing the capsules and contacting the chromogenic material with a developer material, comprising:

exposure means for exposing the photosensitive medium to light representative of an original to form a latent image of the original on the photosensitive medium;

a stack of sheets each having the developer material on one surface thereof;

feeding means for individually feeding the sheets into the image forming apparatus;

blowing means for blowing air between the sheets to prevent double feeding of the sheets by the feeding means;

developing means for rupturing the capsules and contacting the chromogenic material with the developer material on the surface of the sheet; and conveyor means for conveying the sheet fed by the feeding means to the developing means.

7. An image forming apparatus according to claim 6; wherein the blowing means has an outlet positioned to blow air to a constant position between the sheets being fed to prevent double feeding of the sheets.

8. An image forming apparatus for forming a latent image on a photosensitive medium having capsules containing chromogenic material and a radiation curable composition on one surface thereof and developing the latent image by rupturing the capsules and contacting the chromogenic material with a developer material, comprising:

exposure means for exposing the photosensitive medium to light representative of an original to form a latent image of the original on the photosensitive medium;

a sheet having the developer material on one surface thereof;

feeding means for feeding the sheet into the image forming apparatus, the feeding means having suction means for sucking the sheet, means for lifting up the suction means, a first roller disposed above the sheet, a shaft, a swinging arm rotatably supported at one end thereof by the shaft, and a second roller provided on the other end of the swinging arm so that the second roller is moved into contact with the first roller through the lifted sheet by swinging the swinging arm around the shaft;

developing means for rupturing the capsules and contacting the chromogenic material with the developer material on the surface of the sheet; and conveyor means for conveying the sheet fed by the feeding means to the developing means.

9. An image forming apparatus for forming a latent image on a photosensitive medium having capsules containing chromogenic material and a radiation curable composition on one surface thereof and developing the latent image by rupturing the capsules and contacting the chromogenic material with a developer material, comprising:

exposure means for exposing the photosensitive medium to light representative of an original to form a latent image thereof on the photosensitive medium:

a stack of sheets, each sheet having the developer material on one surface thereof;

a sheet tray having a sheet storage portion for storing the stack of sheets;

feeding means for individually feeding the sheets from the sheet tray into the image forming apparatus, the feeding means having suction means for sucking the top sheet in the sheet tray, means for lifting up the suction means, and sheet return means for returning a sheet falling onto the sheet tray into the storage portion of the sheet tray;

developing means for rupturing the capsules and contacting the chromogenic material with the developer material on the surface of the sheet; and conveyor means for conveying the sheet feed by the feeding means to the developing means.

10. In an image recording apparatus for forming a latent image on a photosensitive layer composed of rupturable capsules containing chromogenic material and developing the latent image by rupturing the capsules to release the chromogenic material and contacting the released chromogenic material with developer material: a sheet feeding system for individually feeding sheets having developer material on one surface thereof from a stack of such sheets, the sheet feeding system comprising suction means movable into contact with the top sheet of the stack of sheets for releasably holding the top sheet by suction; pivotable support means for supporting the suction means and being pivotal in one direction to move the suction means into contact with the top sheet of the stack to enable the suction means to releasably hold the top sheet by suction and pivotal in the other direction to move the suction means away from the stack to thereby separate at least a portion of the top sheet from the stack; actuating means for selectively actuating the support means in the one pivotal direction and the other pivotal direction; and means including a contact roller movable into frictional contact with the separated top sheet for feeding the top sheet into the image recording apparatus.

11. An image recording apparatus according to claim 10; wherein the means for feeding the top sheet comprises a rotationally driven feed roller disposed above the stack in the region where the top sheet is separated from the stack, and means mounting the contact roller for movement toward the feed roller to define a nip between the two rollers for receiving the separated top sheet and for movement away from the feed roller to permit the separated top sheet to be led to the feed roller.

12. An image recording apparatus according to claim 11; wherein the means mounting the contact roller comprises at least one pivotal arm rotatably carrying thereon the contact roller and being pivotal in opposite directions to move the contact roller toward and away from the feed roller.

13. An image recording apparatus according to claim 12; wherein the means mounting comprises a pair of spaced apart pivotal arms rotatably carrying therebetween the contact roller and being pivotal in unison in opposite directions to move the contact roller toward and away from the feed roller.

14. An image recording apparatus according to claim 10; including means mounting the support means for downward and upward movement relative to the stack of sheets.

15. An image recording apparatus according to claim 10; including means for directing an air flow between the top sheet held by the suction means and the top of the stack to prevent double feeding of the sheets from the stack.

16. In an image recording apparatus for forming a latent image on a photosensitive layer composed of rupturable capsules containing chromogenic material and developing the latent image by rupturing the capsules to release the chromogenic material and contacting the released chromogenic material with developer material: a sheet feeding system for individually feeding sheets having developer material on one surface thereof from a stack of such sheets, the sheet feeding system comprising suction means movable into contact with the top sheet of the stack of sheets for releasably holding the top sheet by suction; pivotable support means for supporting the suction means and being pivotal in one direction to move the suction means into contact with the top sheet of the stack to enable the suction means to releasably hold the top sheet by suction and pivotal in the other direction to move the suction means away from the stack to thereby separate at least a portion of the top sheet from the stack; actuating means for selectively actuating the support means in the one pivotal direction and the other pivotal direction; and means for directing an air flow between the underside of the top sheet held by the suction means and the top of the stack to prevent double feeding of sheets from the stack.

17. An image recording apparatus according to claim 16; wherein the means for directing an air flow comprises a blower having a casing, the casing having an outlet positioned to direct air between the underside of the top sheet held by the suction means and the top of the stack.

18. In an image recording apparatus for forming a latent image on a photosensitive layer composed of rupturable capsules containing chromogenic material and developing the latent image by rupturing the capsules to release the chromogenic material and contacting the released chromogenic material with developer material: a sheet feeding system for individually feeding sheets having developer material on one surface thereof from a stack of such sheets, the sheet feeding system comprising suction means movable into contact with the top sheet of the stack of sheets for releasably holding the top sheet by suction; support means for supporting the suction means; and actuating means for sequentially lowering the support means to bring one end thereof into pivotal contact with the top sheet, then pivoting the support means about the one end thereof in one direction to move the suction means into contact with the top sheet and in the other direction to lift the top sheet held by the suction means, and then raising the support means away from the stack while the top sheet is held by the suction means to initiate feeding of the top sheet into the image recording apparatus.

19. An image recording apparatus according to claim 18; wherein the actuating means comprises at least one vertically displaceable lever, means pivotally connecting the support means to the lever, biasing means for biasing the support means in the other pivotal direction on the lever, and means for vertically displacing the lever whereby lowering of the lever brings the one end of the support means into contact with the top sheet followed by pivotal movement of the support in one direction about the one end thereof and raising of the lever effects pivotal movement of the support means in the other direction about the one end thereof followed by movement of the support means away from the stack.

20. An image recording apparatus according to claim 18; wherein means for directing an air flow between the underside of the top sheet held by the suction means and the top of the stack to prevent double feeding of sheets from the stack.

21. An image recording apparatus according to claim 18; including means for regulating the contact pressure between the support means and the top sheet.

22. An image recording apparatus according to claim 18; including separating means for separating the top sheet held by the suction means from an adjoining sheet accidentally adhering to the underside of the top sheet.

23. An image recording apparatus according to claim 22; wherein the separating means comprises means for flexing the top sheet held by the suction means to a greater extent than the adjoining sheet to thereby release the adherence between the two sheets.

24. An image recording apparatus according to claim 23; wherein the separating means comprises a set of separation members disposed in the path of travel of the top sheet while the same is held by the suction means and engageable therewith to effect flexing of the top sheet.

25. An image recording apparatus according to claim 24; wherein the separation members have protecting means for protecting the sheets and preventing damage to the developer material.

26. An image recording apparatus according to claim 22; including return means for returning the separated adjoining sheet to the stack of sheets.

27. An image recording apparatus according to claim 18; including a tray for containing therein the stack of sheets, and return means for returning a sheet that falls from the suction means to the tray.

* * * * *